US 6,550,231 B2

(12) United States Patent
Krone et al.

(10) Patent No.: US 6,550,231 B2
(45) Date of Patent: Apr. 22, 2003

(54) HARVESTING MACHINE, ESPECIALLY A SELF-PROPELLED PICK-UP CHOPPER

(75) Inventors: Bernard Krone, Spelle (DE); Karl-Heinz Radke, Wilthen (DE); Thomas Strobel, Langenwolmsdorf (DE); Dieter Berth, Neustadt (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 09/845,689

(22) Filed: Apr. 30, 2001

(65) Prior Publication Data

US 2001/0037637 A1 Nov. 8, 2001

(30) Foreign Application Priority Data

May 4, 2000 (DE) .......................................... 100 21 661

(51) Int. Cl.⁷ ................................................ A01D 45/02
(52) U.S. Cl. ........................................................ 56/60
(58) Field of Search .............................. 180/14.1, 14.2; 56/14.5, 14.6, 122, 15.8, 15.9, 16.3, 60; 460/11–13, 68, 69, 70, 80, 101

(56) References Cited

U.S. PATENT DOCUMENTS

| 4,099,594 A | * | 7/1978 | Smith et al. ................ 180/14.1 |
| 4,972,664 A | * | 11/1990 | Frey ............................ 56/13.6 |
| 5,497,605 A | * | 3/1996 | Underwood et al. ........ 460/101 |

* cited by examiner

Primary Examiner—Robert E. Pezzuto
(74) Attorney, Agent, or Firm—Jordan and Hamburg LLP

(57) ABSTRACT

A harvesting machine such as a self-propelled pick-up chopper including a feeder housing having supplying elements and which can be transferred from a swiveled-in operating position about an axle into a swiveled-up maintenance position. In order to be able to transfer the feeder housing rapidly into the swiveled-up maintenance position, the feeder housing can be swung out of the way forward towards the ground in the driving direction about an essentially horizontal axle aligned transversely to the traveling direction of the machine. The supplying elements of the feeder housing can be driven over a drive shaft having a first portion which can be swiveled in the same direction with the feeder housing and a second portion different than the first portion which can be expanded and contracted telescope-like.

18 Claims, 4 Drawing Sheets

HARVESTING MACHINE, ESPECIALLY A SELF-PROPELLED PICK-UP CHOPPER

BACKGROUND OF THE INVENTION

Figure 1:
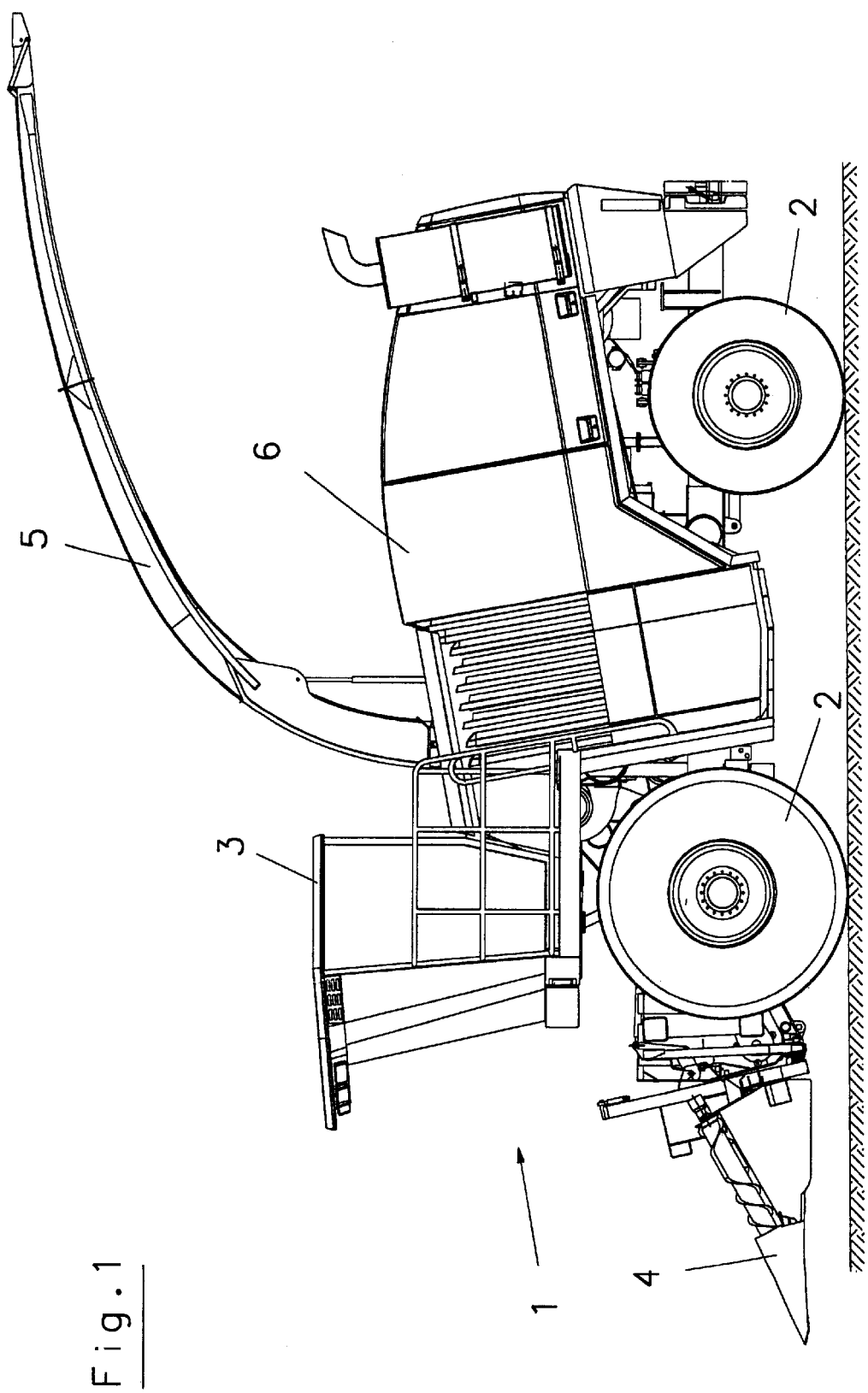

The invention relates to a harvesting machine, especially to a self-propelled pick-up chopper for picking up and chopping corn, wilted grass, green feed and other similar harvested material with a feeder housing, which can be driven, has supplying elements and can be transferred from a swiveled-in operating position about an axle into a swiveled-up maintenance position.

Harvesting machines of the aforementioned type are known in various developments. Such machines, especially also self-propelled pick-up choppers, have been developed in recent years into high performance machines, which are used for mowing and for harvesting corn, as well as increasingly for chopping wilted material, hay, straw and similar harvested material. For this purpose, a pick-up, a corn dentition or a different attachment is disposed ahead of the feeder housing.

In order to be able to perform maintenance work on the chopping aggregate, which is disposed after the feeder housing, especially when the attachments are dismantled, it is known that the feeder housing can be constructed hinged and with quick-release fittings, for example, in order to have quick access to a knife drum and counter knife edge for maintenance purposes.

SUMMARY OF THE INVENTION

It is an object of the present invention to develop a harvesting machine of the type named above so that a chopping aggregate, disposed after the feeder housing, is accessible quickly and easily.

For accomplishing this objective, the harvesting machine of the above-mentioned type is distinguished owing to the fact that the feeder housing can be swung out of the way forward towards the ground in the driving direction about an essentially horizontal axle, which is aligned transversely to the traveling direction of the harvesting machine and that the supplying elements of the feeder housing can be driven over a drive shaft, which can be swiveled regionally in the same direction with the feeder housing and is constructed telescope-like regionally.

With that, a harvesting machine is made available, for which the feeder housing can be swung up for maintenance work at the chopper aggregate without requiring the drive shaft or shafts of supplying elements of the feeder housing to be dismantled since, due to its special configuration and arrangement, the drive shaft can follow this swinging out of the way motion of the feeder housing. For this purpose, a region of the drive shaft is swung out of the way in the same direction with a regional change in the length of the telescopic drive shaft region. The feeder housing can therefore be swung up with only a few manipulations and, with that, exceedingly quickly, so that downtimes of the harvesting machine are reduced significantly.

Preferably, the telescopic region of the drive shaft between the region of the drive shaft, which can be swiveled in the same direction as the feeder housing, and the hinged connection of the drive shaft to the harvesting machine are provided so that the pivotable region of the drive shaft engages the feeder housing and is constructed with an unvarying length up to the swiveling axle of the pivotable region of the drive shaft. This swiveling axle is provided so that it is located as close as possible to the folding axle of the feeder housing. For this purpose, this swiveling axle need not be aligned coaxially with the folding axle of the feeder housing, depending on the position of the drive shaft. A swiveling in the same direction as the feeder housing or the corresponding swinging out of the way in the same direction can also be carried out if this swiveling axle of the drive shaft, which can be swiveled in the same direction, is placed in a region, which is located so close to the folding axle of the feeder housing, that the swiveling axle is aligned almost parallel to the folding axle or aligned to the latter at an acute angle, whether it be in front of or behind the folding axle in the driving direction or above or slightly below this folding axle. In this connection, it is important that the swiveling axle be located so close to the folding axle of the feeder housing, that the swiveling of the pivotable region of the drive shaft in the same direction can be carried out without the need for dismantling the drive shaft. Moreover, the driving connection is maintained when the driving mechanism is switched off.

The telescopic region of the drive shaft can also be fashioned by drive shaft elements, such as rod elements, which freely engage one another and can reliably transfer the rotational movement for the supplying elements. These can, for example, be square or oval elements.

Further advantageous developments of the invention arise out of the following description and the accompanying drawings.

IN THE DRAWINGS

Figure 2:
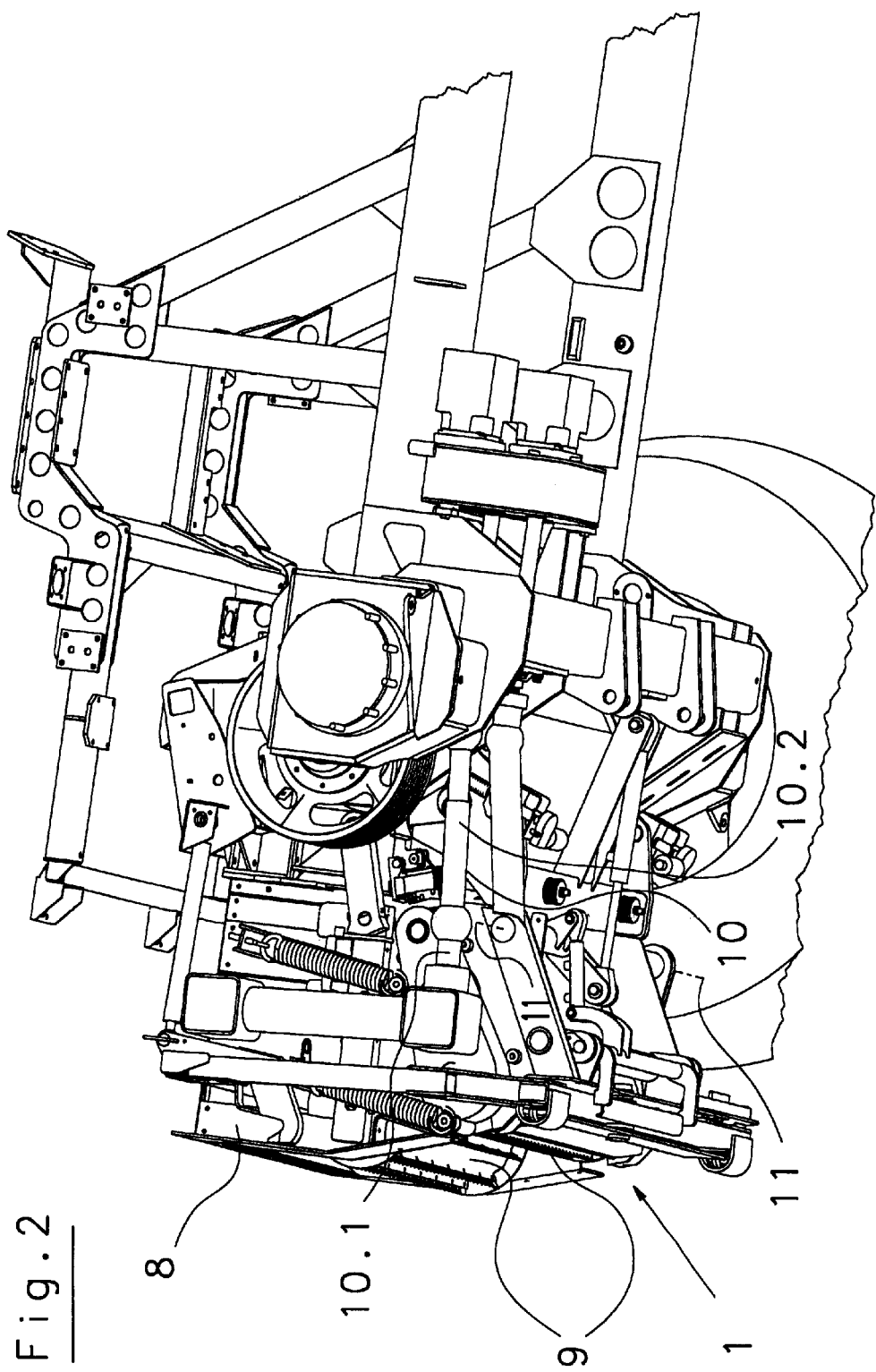
Figure 3:
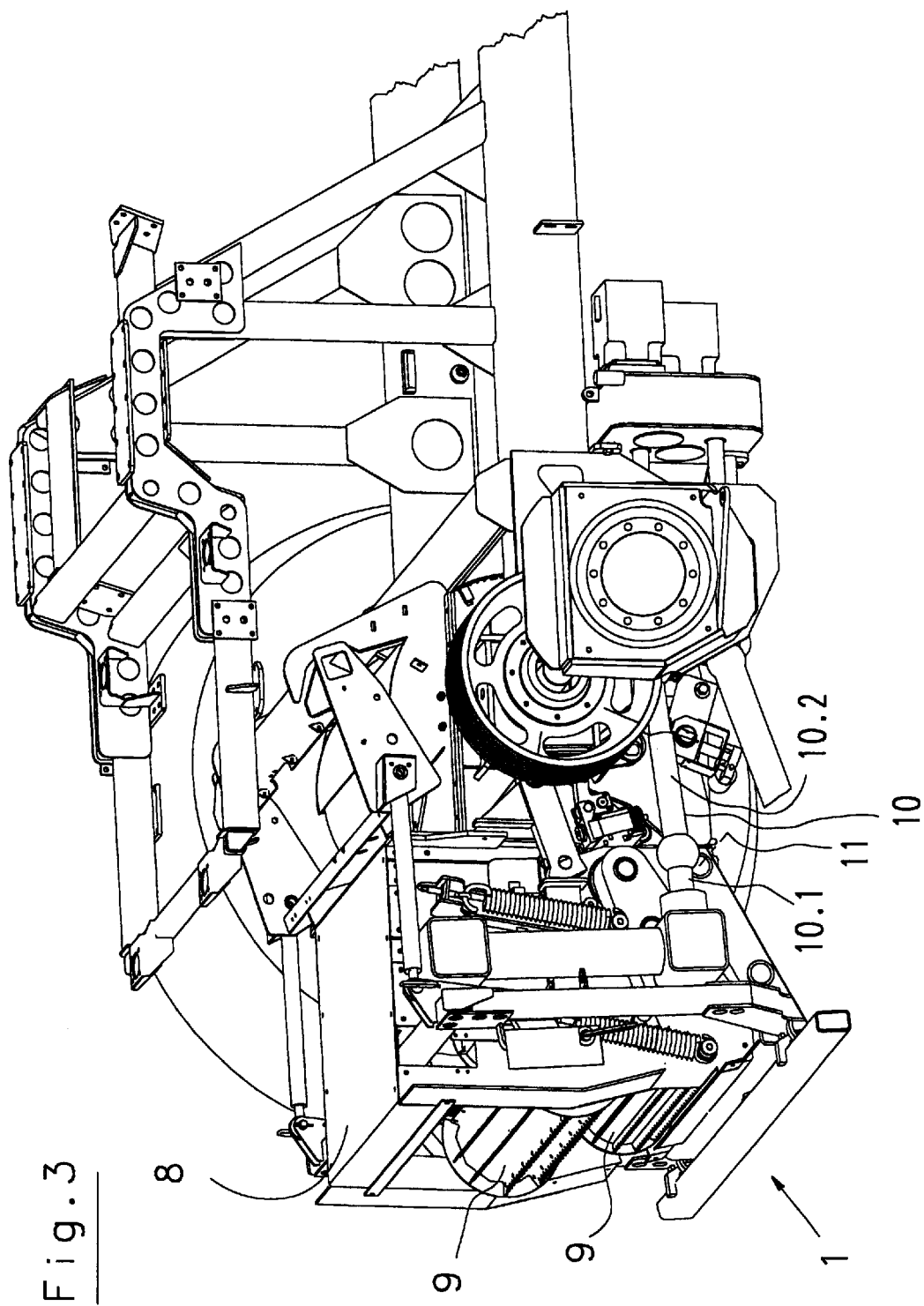
Figure 4:
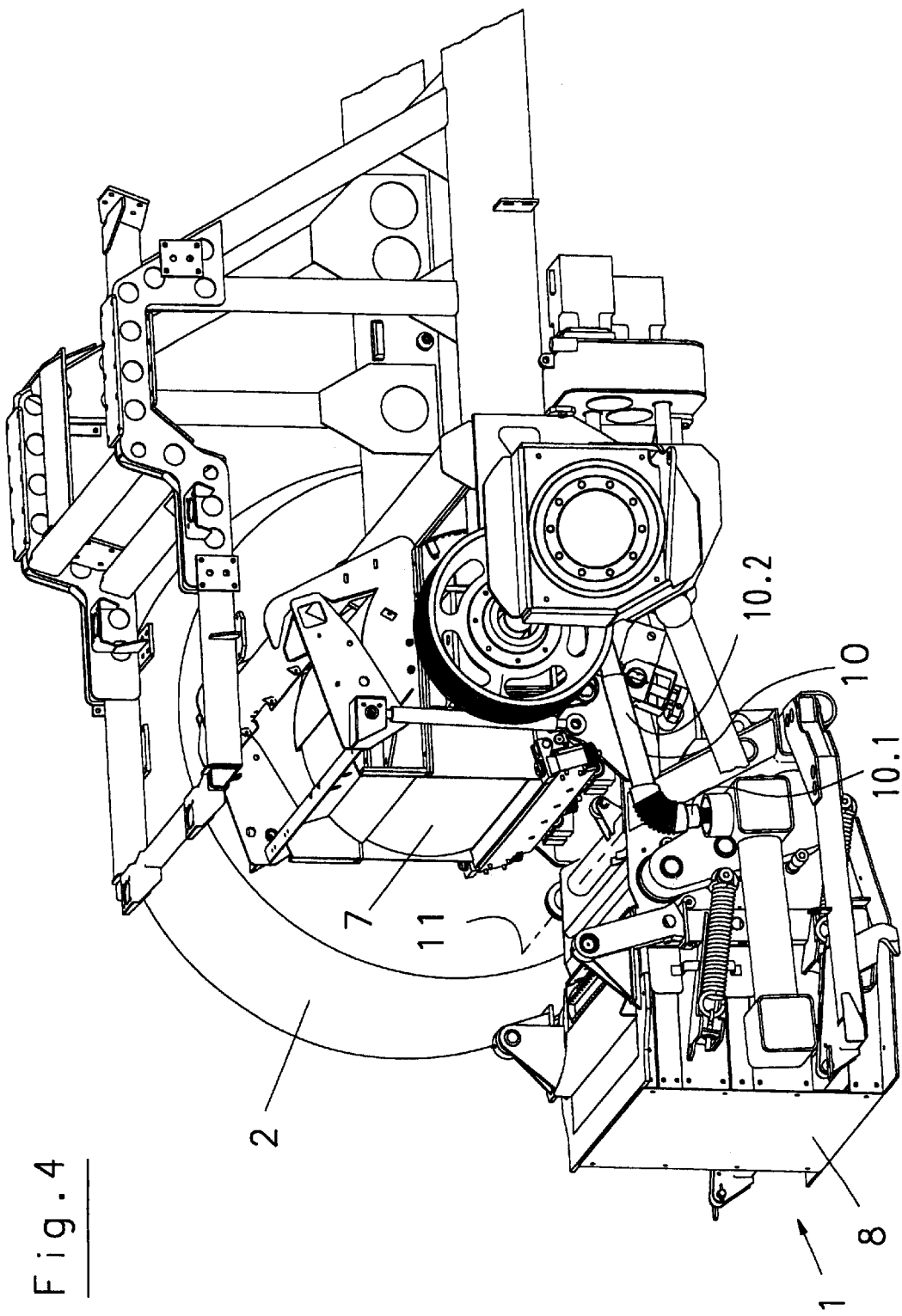

FIG. 1 shows an example of an inventive self-propelled pick-up chopper,

FIG. 2 sectionally, in an oblique view from below, shows parts of the example of FIG. 1 with representation of the feeder housing with a hydraulic cylinder for the parts, which can be swung out of the way, however without the parts disposed ahead of the feeder housing, FIG. 3 shows a representation, similar to that of FIG. 2, in a perspective side representation with the feeder housing in the operating position; and FIG. 4 shows a representation, similar to that of FIG. 3, with a feeder housing, which can be swung out of the way towards the ground and forwards in the traveling direction.

DESCRIPTION OF THE PREFERRED EMBODIMENT

The pick-up chopper 1, shown quite generally in FIG. 1, has wheels 2, a cabin 3, a corn dentition 4, which is upstream in the example shown, an ejection pipe 5 and units which are arranged within the machine housing 6, such as the driving mechanism, the transmission, the chopping device 7, the corn cracker and similar units, which are typically encountered in a pick-up chopper. The feeder housing 8, arranged in front of the chopping device 7 (see FIG. 4), has feeding elements 9, such as the two augers, which are arranged one above the other, as well as additional drawing-in rollers and pre-pressing rollers, which can be driven by a drive shaft 10 over drive units, the details of which cannot be seen here.

The feeder housing 8 is shown in FIGS. 2 and 3 in the position, in which it is locked in the operating position; in FIG. 4, on the other hand, it is shown in the maintenance position, in which it is folded out of the way forward in the driving position. For this purpose, the feeder housing 8 is constructed so that it can be swung out of the way about an essentially horizontal axle 11, which is aligned transversely to the traveling direction.

The drive shaft 10, in a drive shaft region 10.1, is also arranged so that it can be swiveled in the same direction as the feeder housing 8 and, moreover, has a telescopically constructed drive shaft region 10.2, so that the feeder housing 8 can be transferred into the maintenance position, shown in FIG. 4, in which, for example, the chopping device 7 is accessible, without the need to dismantle the drive shaft 10 from the operating positions, which can be seen in FIGS. 2 and 3. This can be accomplished with only a few manipulations after, for example, appropriate quick-release fittings are undone and a hydraulic cylinder is actuated.

What we claim is:

1. A harvesting machine having a traveling direction, comprising:

a feeder housing;

a transverse axle arranged transverse to the traveling direction of the machine, said feeder housing being coupled to said transverse axle such that said feeder housing is rotatable about said transverse axle between an operating position and a maintenance position;

supply elements arranged in said feeder housing; and a drive shaft for driving said supply elements, said drive shaft including a first portion arranged to swivel upon rotation of said feeder housing about said transverse axle and a second portion having a variable length, said second portion being different than said first portion, said first portion being arranged to swivel relative to said second portion upon rotation of said feeder housing about said transverse axle.

2. The harvesting machine of claim 1, wherein said second portion of said drive shaft is arranged to elongate and contract telescopically.

3. The harvesting machine of claim 1, wherein said drive shaft has a first end region hingedly connected to the machine.

4. The harvesting machine of claim 3, wherein said drive shaft has a second end region connected to said feeder housing.

5. The harvesting machine of claim 3, wherein said second portion of said drive shaft is arranged between said first end region of said drive shaft and said first portion of said drive shaft.

6. The harvesting machine of claim 1, wherein said first portion of said drive shaft is arranged to swivel in the same direction as said feeder housing rotates from the operating position to the maintenance position.

7. The harvesting machine of claim 1, wherein said first portion of said drive shaft has a substantially constant length.

8. The harvesting machine of claim 1, wherein said drive shaft further includes a swiveling axle about which said first portion of said drive shaft swivels.

9. The harvesting machine of claim 8, wherein said drive shaft is arranged such that said swiveling axle is proximate said transverse axle.

10. The harvesting machine of claim 8, wherein said swiveling axle is substantially parallel to said transverse axle.

11. The harvesting machine of claim 8, wherein said swiveling axle is arranged at an acute angle to said transverse axle.

12. The harvesting machine of claim 1, wherein said second portion of said drive shaft is formed by cooperating elongate members.

13. The harvesting machine of claim 1, further comprising a chopper device, said feeder housing being arranged alongside said chopper device when said feeder housing is in the operating position and being rotatable forward and downward into the maintenance position in which said chopper device is unobstructed by said feeder housing.

14. The harvesting machine of claim 1, wherein said transverse axle is substantially horizontal.

15. The harvesting machine of claim 1, wherein said drive shaft is arranged exterior of said feeder housing.

16. The harvesting machine of claim 8, wherein said swiveling axle is interposed between said first portion of said drive shaft and said second portion of said drive shaft.

17. The harvesting machine of claim 1, wherein said first portion of said drive shaft is connected to said feeder housing.

18. The harvesting machine of claim 1, further comprising a machine housing, said second portion of said drive shaft being connected to said machine housing.

* * * * *